United States Patent
Warburton et al.

(10) Patent No.: US 9,629,042 B2
(45) Date of Patent: Apr. 18, 2017

(54) SYSTEM AND METHOD FOR PROVIDING COLLABORATIVE NEIGHBOR MANAGEMENT IN A NETWORK ENVIRONMENT

(71) Applicant: CISCO TECHNOLOGY, INC., San Jose, CA (US)

(72) Inventors: Nigel Edward Warburton, Woking Surrey (GB); Sandro Grech, Bath (GB); Lokendra Sharma, Swindon (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 58 days.

(21) Appl. No.: 14/612,794

(22) Filed: Feb. 3, 2015

(65) Prior Publication Data

US 2016/0165494 A1 Jun. 9, 2016

Related U.S. Application Data (60) Provisional application No. 62/088,254, filed on Dec. 5, 2014.

(51) Int. Cl.
*H04W 4/00* (2009.01)
*H04W 36/00* (2009.01)
(Continued)

(52) U.S. Cl.
CPC ..... *H04W 36/0083* (2013.01); *H04L 67/1072* (2013.01); *H04W 24/10* (2013.01); *H04W 84/045* (2013.01)

(58) Field of Classification Search
None
See application file for complete search history.

(56) References Cited

U.S. PATENT DOCUMENTS 6,483,820 B1 11/2002 Davidson et al.
7,379,739 B2 5/2008 Rajkotia et al.
(Continued)

FOREIGN PATENT DOCUMENTS

CN 102378288 3/2012
CN 105050072 A 11/2015
(Continued)

OTHER PUBLICATIONS

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex-France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8 — 8.3.9 pp. 289-292; §8.5.21 pp. 357-365; §10.2.7 pp. 620-623; Annex B.3 pp. 2045-2052].

(Continued)

*Primary Examiner* — Otis L Thompson, Jr.
(74) *Attorney, Agent, or Firm* — Patent Capital Group (57) ABSTRACT

A method is provided in one example embodiment and may include populating a neighbor list including one or more neighbors for a cell radio using neighbor information gathered for the cell radio; receiving a detected set measurement report from a user equipment (UE), wherein the measurement report includes, at least in part, one or more primary scrambling codes (PSCs) for one or more other neighbors detected by the UE; and updating the neighbor list to include one or more of the other neighbors based, at least in part, on whether any of the one or more PSCs received in the measurement report are included in the previously gathered neighbor information.

17 Claims, 5 Drawing Sheets

(51) Int. Cl.
*H04L 29/08* (2006.01)
*H04W 24/10* (2009.01)
*H04W 84/04* (2009.01)

(56) References Cited

U.S. PATENT DOCUMENTS

| | | | |
|---|---|---|---|
| 7,983,667 B2 | 7/2011 | Hart et al. | |
| 8,107,950 B2 | 1/2012 | Amerijoo et al. | |
| 8,320,965 B2 | 11/2012 | Kwun | |
| 8,340,711 B1 | 12/2012 | Glass et al. | |
| 8,588,698 B2 | 11/2013 | Brisebois | |
| 8,611,299 B2 | 12/2013 | Yang et al. | |
| 8,639,243 B2 | 1/2014 | Radulescu et al. | |
| 8,712,459 B2 | 4/2014 | Lim et al. | |
| 8,792,886 B2 | 7/2014 | Meshkati | |
| 8,830,936 B2 | 9/2014 | Ren | |
| 8,917,658 B2 | 12/2014 | Bjork | |
| 9,219,816 B2 | 12/2015 | Grayson et al. | |
| 9,226,255 B2 | 12/2015 | Grayson et al. | |
| 9,350,737 B2 | 5/2016 | Fernandez Alonso | |
| 2005/0036462 A1 | 2/2005 | Sillasto et al. | |
| 2006/0229087 A1 | 10/2006 | Davis et al. | |
| 2007/0008885 A1 | 1/2007 | Bonner | |
| 2009/0137246 A1* | 5/2009 | Xing | H04W 56/0035 455/434 |
| 2009/0305684 A1 | 12/2009 | Jones | |
| 2010/0056184 A1 | 3/2010 | Vakil | |
| 2010/0112982 A1 | 5/2010 | Singh et al. | |
| 2010/0124929 A1* | 5/2010 | Lee | H04W 48/20 455/436 |
| 2010/0135237 A1 | 6/2010 | Papasakellariou | |
| 2010/0157922 A1 | 6/2010 | Kim et al. | |
| 2010/0182955 A1 | 7/2010 | Bjork | |
| 2010/0240314 A1 | 9/2010 | Chang | |
| 2010/0260036 A1 | 10/2010 | Molnar et al. | |
| 2010/0260068 A1 | 10/2010 | Bhatt et al. | |
| 2010/0279628 A1 | 11/2010 | Love et al. | |
| 2011/0110316 A1 | 5/2011 | Chen et al. | |
| 2011/0128913 A1 | 6/2011 | Chowdury | |
| 2011/0130144 A1* | 6/2011 | Schein | H04L 41/12 455/442 |
| 2011/0170481 A1* | 7/2011 | Gomes | H04W 36/0083 370/328 |
| 2011/0177817 A1 | 7/2011 | Hole | |
| 2011/0201333 A1 | 8/2011 | Kwon | |
| 2011/0211514 A1 | 9/2011 | Hamalainen | |
| 2011/0237283 A1 | 9/2011 | Shan et al. | |
| 2011/0267967 A1 | 11/2011 | Ratasuk | |
| 2011/0314178 A1 | 12/2011 | Kanode | |
| 2012/0004003 A1 | 1/2012 | Shaheen et al. | |
| 2012/0015653 A1* | 1/2012 | Paliwal | H04W 24/10 455/435.1 |
| 2012/0100849 A1 | 4/2012 | Marsico | |
| 2012/0129537 A1 | 5/2012 | Liu et al. | |
| 2012/0191842 A1 | 7/2012 | Hu et al. | |
| 2012/0210003 A1 | 8/2012 | Castro | |
| 2012/0258720 A1 | 10/2012 | Tinnakornsrisphap et al. | |
| 2012/0260299 A1 | 10/2012 | Kotecha | |
| 2012/0265888 A1 | 10/2012 | Roeland et al. | |
| 2012/0269167 A1 | 10/2012 | Velev | |
| 2012/0276913 A1 | 11/2012 | Lim | |
| 2012/0290452 A1 | 11/2012 | Pancorbo Marcos | |
| 2012/0327850 A1 | 12/2012 | Wang et al. | |
| 2013/0003697 A1 | 1/2013 | Adjakple et al. | |
| 2013/0077482 A1 | 3/2013 | Krishna et al. | |
| 2013/0114484 A1 | 5/2013 | Suzuki | |
| 2013/0132570 A1 | 5/2013 | Lopez Nieto | |
| 2013/0136072 A1 | 5/2013 | Bachmann et al. | |
| 2013/0139221 A1 | 5/2013 | Gundavelli | |
| 2013/0155948 A1 | 6/2013 | Pinheiro | |
| 2013/0155954 A1 | 6/2013 | Wang et al. | |
| 2013/0163543 A1 | 6/2013 | Freda et al. | |
| 2013/0182680 A1 | 7/2013 | Choi et al. | |
| 2013/0229945 A1 | 9/2013 | Cha et al. | |
| 2013/0235759 A1* | 9/2013 | Meshkati | H04W 24/02 370/254 |
| 2013/0294356 A1 | 11/2013 | Bala et al. | |
| 2013/0308531 A1 | 11/2013 | So et al. | |
| 2013/0326001 A1 | 12/2013 | Jorgensen et al. | |
| 2013/0337769 A1 | 12/2013 | Bhatia | |
| 2013/0337821 A1 | 12/2013 | Clegg | |
| 2013/0339783 A1 | 12/2013 | Alonso et al. | |
| 2013/0343288 A1 | 12/2013 | Ratasuk et al. | |
| 2013/0343304 A1 | 12/2013 | Kaippallimalil et al. | |
| 2014/0003225 A1 | 1/2014 | Mann et al. | |
| 2014/0010086 A1 | 1/2014 | Etemad et al. | |
| 2014/0011505 A1 | 1/2014 | Liao | |
| 2014/0016629 A1 | 1/2014 | Pancorbo Marcos | |
| 2014/0078986 A1 | 3/2014 | Kaippallimalil et al. | |
| 2014/0086226 A1 | 3/2014 | Zhao et al. | |
| 2014/0094139 A1 | 4/2014 | Xu | |
| 2014/0112251 A1 | 4/2014 | Kim et al. | |
| 2014/0146732 A1 | 5/2014 | Olufunmilola et al. | |
| 2014/0155109 A1 | 6/2014 | Vaidya et al. | |
| 2014/0177583 A1 | 6/2014 | Aso | |
| 2014/0185537 A1 | 7/2014 | Papasakellariou | |
| 2014/0241316 A1 | 8/2014 | Okmyanskiy et al. | |
| 2014/0254367 A1 | 9/2014 | Jeong | |
| 2014/0287759 A1* | 9/2014 | Purohit | H04W 56/0015 455/437 |
| 2014/0287769 A1 | 9/2014 | Taori | |
| 2014/0297888 A1 | 10/2014 | McCann | |
| 2014/0301351 A1 | 10/2014 | Gao | |
| 2014/0307589 A1 | 10/2014 | Li | |
| 2014/0321328 A1 | 10/2014 | Zuniga | |
| 2014/0328266 A1 | 11/2014 | Yu | |
| 2014/0342745 A1 | 11/2014 | Bhushan | |
| 2014/0378131 A1 | 12/2014 | Rui | |
| 2015/0009826 A1 | 1/2015 | Ma | |
| 2015/0044989 A1 | 2/2015 | De Foy | |
| 2015/0055588 A1 | 2/2015 | Yerramilli et al. | |
| 2015/0063101 A1 | 3/2015 | Touati | |
| 2015/0103768 A1 | 4/2015 | Chen | |
| 2015/0103772 A1 | 4/2015 | Carnero Ros | |
| 2015/0117347 A1 | 4/2015 | Iwai | |
| 2015/0146594 A1 | 5/2015 | Grayson | |
| 2015/0172471 A1 | 6/2015 | Castro | |
| 2015/0181577 A1 | 6/2015 | Moulsley | |
| 2015/0200760 A1 | 7/2015 | Xia | |
| 2015/0208403 A1 | 7/2015 | Takeda | |
| 2015/0222634 A1 | 8/2015 | Ludwig | |
| 2015/0245241 A1 | 8/2015 | Posz | |
| 2015/0264652 A1 | 9/2015 | Zhang | |
| 2015/0296516 A1 | 10/2015 | Jung | |
| 2015/0365931 A1 | 12/2015 | Ng et al. | |
| 2015/0382386 A1 | 12/2015 | Castro Castro | |
| 2016/0007170 A1 | 1/2016 | Vaidya et al. | |
| 2016/0007316 A1 | 1/2016 | Vaidya et al. | |
| 2016/0007378 A1 | 1/2016 | Bertorelle | |
| 2016/0037490 A1 | 2/2016 | Pazhyannur et al. | |
| 2016/0037550 A1 | 2/2016 | Barabell | |
| 2016/0073282 A1 | 3/2016 | Speicher | |
| 2016/0073283 A1 | 3/2016 | Grayson | |
| 2016/0073285 A1 | 3/2016 | Graham | |
| 2016/0073328 A1 | 3/2016 | Li | |
| 2016/0094976 A1 | 3/2016 | Enomoto | |
| 2016/0099794 A1 | 4/2016 | Chendamarai | |
| 2016/0105882 A1 | 4/2016 | Park | |
| 2016/0127137 A1 | 5/2016 | Fernandez Alonso | |
| 2016/0134761 A1 | 5/2016 | Campbell et al. | |
| 2016/0135143 A1 | 5/2016 | Won et al. | |
| 2016/0156729 A1 | 6/2016 | Essigmann | |
| 2016/0191631 A1 | 6/2016 | Haraszti | |
| 2016/0226669 A1 | 8/2016 | Livanos et al. | |
| 2016/0227428 A1 | 8/2016 | Novlan et al. | |
| 2016/0234706 A1 | 8/2016 | Liu et al. | |
| 2016/0234763 A1 | 8/2016 | Um et al. | |
| 2016/0242203 A1 | 8/2016 | You | |
| 2016/0262041 A1 | 9/2016 | Ronneke | |

(56) References Cited

U.S. PATENT DOCUMENTS

| | | |
|---|---|---|
| 2016/0295357 A1 | 10/2016 | Grayson et al. |
| 2016/0295521 A1 | 10/2016 | Grayson et al. |

FOREIGN PATENT DOCUMENTS

| | | |
|---|---|---|
| CN | 105307279 | 2/2016 |
| CN | 105407509 | 3/2016 |
| CN | 105407540 | 3/2016 |
| CN | 105592460 | 5/2016 |
| EP | 2234422 | 9/2010 |
| EP | 2453700 | 5/2012 |
| EP | 2466831 | 6/2012 |
| EP | 2757850 | 7/2014 |
| EP | 2981119 | 2/2016 |
| EP | 2993868 | 3/2016 |
| EP | 2996386 | 3/2016 |
| EP | 3029988 | 6/2016 |
| EP | 3046386 | 7/2016 |
| WO | WO2009/025601 | 2/2009 |
| WO | WO2011/002958 | 1/2011 |
| WO | WO2011/085238 | 7/2011 |
| WO | WO2011/134529 | 11/2011 |
| WO | WO2012/055984 | 5/2012 |
| WO | WO2012/135121 | 10/2012 |
| WO | WO2013/041574 | 3/2013 |
| WO | WO2013/082245 | 6/2013 |
| WO | WO2013/086659 | 6/2013 |
| WO | WO2013/169991 | 11/2013 |
| WO | WO2014/051606 | 4/2014 |
| WO | WO2014/177208 | 11/2014 |
| WO | WO2016/126413 | 8/2016 |
| WO | WO2016/126414 | 8/2016 |

OTHER PUBLICATIONS

"TR-196 Femto Access Point Service Data Model," Broadband Forum Technical Report, Issue 2, Issue Date: Nov. 2011, © The Broadband Forum. All Rights Reserved; 46 pages.

"TR-069 CPE WAN Management Protocol," Broadband Forum Technical Report, Issue: 1 Amendment 4, Issue Date: Jul. 2011, Protocol Version 1.3, © The Broadband Forum. All Rights Reserved; 190 pages.

Adrangi, F., et al., "Chargeable User Identity," Network Working Group RFC 4372, Jan. 2006, 10 pages.

"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex-France, May 2014, 64 pages.

"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex-France, Jun. 2014; See Sections 1-5, pp. 11-76.

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex-France, Jul. 2014; Section 4, pp. 17-88.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.

"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex-France, Mar. 2011; See Section 4-6, pp. 14-116.

"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.

"Paging Channel Selection," UMTS World; first published on or about Jun. 22, 2003; 3 pages http://www.umtsworld.com/technology/paging.html.

Holbrook, H., et al., "Source-Specific-Multicast for IP," Network Working Group RFC 4607, Aug. 2006.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex-France, Jul. 2014.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex-France, Jul. 2014.

"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.

"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.

"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.

"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex-France, Sep. 2014.

"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.

(56) References Cited

OTHER PUBLICATIONS

"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.

"3GPP TS 32.522 v11.2.0, 3rd Generation Partnership Project Technical Specification: Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

3GPP TSG-RAN WG3 #61bis, R3-081174, "Solution for interference reduction SON use case," Orange, Alcatel-Lucent, Agenda Item 10.1.1c; Kansas City, MO, USA; 6 pages.

3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO, USA, May 5-9, 2008; 6 pages.

3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.

"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex-France, Oct. 2014; 170 pages.

"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex-France, Oct. 2014, 232 pages.

"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12)," [Relevant Sections 3, 4, 8 and 8 only], ETSI, 650 Route des Lucioles, F-06921, Sophia Antipolis Cedex-France, Oct. 2014.

"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex-France, Oct. 2014; 64 pages.

"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex-France, Nov. 2014.

"ETSI TS 125 469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," © European Telecommunications Standards Institute 2013; Apr. 2013; 78 pages.

"ETSI TS 125 469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (3GPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F06921 Sophia Antipolis Cedex, France, Jun. 2010; 17 pages.

"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.

"Broadband Forum Technical Report: TR-196 Femto Access Point Service Data Model," Issue: 1, Issue Date: Apr. 2009, © The Broadband Forum; 131 pages.

"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.

"PDCCH Processing," published by Gio Zakradze on Dec. 29, 2014; 56 pages.

"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.

"Extensible Authentication Protocol," Wikipedia, the free encyclopedia, Sep. 16, 2013, 10 pages http://en.wikipedia.org/wiki/Extensible_Authentication_Protocol#EAP-FAST.

"Link Layer Discovery Protocol," Wikipedia, the free encyclopedia, Sep. 25, 2013, 4 pages, http://en.wikipedia.org/wiki/Link_Layer_Discovery_Protocol.

"Radius," Wikipedia, the free encyclopedia, Sep. 26, 2013, 12 pages http://en.wikipedia.org/wiki/RADIUS.

Ashraf, Imran, "Distributed Radio Coverage Optimization in Enterprise Femtocell Networks," International Conference on Communications ICC 2010, May 23-27, 2010, Cape Town, South Africa; 6 pages.

Calhoun, P., "Diameter Base Protocol," Network Working Group RFC 3588, Sep. 2003; 147 pages.

Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.

Haverinen, H., "Extensible Authentication Protocol Method for Global System for Mobile Communications (GSM) Subscriber Identity Modules (EAP-SIM)," Network Working Group RFC 4186, Jan. 2006,93 pages.

Horn, Gavin, "3GPP Femtocells: Architecture and Protocols," Qualcomm Incorporated, 5775 Morehouse Drive, San Diego, CA, Sep. 2010; 64 pages.

Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.

EPO Dec. 15, 2015 Extended Search Report and Written Opinion from European Application Serial No. 15178914.6.

Ratasuk, Rapeepat, et al., "License-exempt LTE Deployment in Heterogeneous Network," 2012 International Symposium on Wireless Communications Systems (ISWCS), Aug. 28, 2012, pp. 246-250.

(56) References Cited

OTHER PUBLICATIONS

Almeida, Erika, et al., "Enabling LTE/Wifi Coexistence by LTE Blank Subframe Allocation," 2013 IEEE International Conference on Communications (ICC), Jun. 9, 2013, pp. 5083-5088.
Saad, Sawsan A., et al., "A Survey on Power Control Techniques in Femtocell Networks," Journal of Communications vol. 8, No. 12, Dec. 2013; 10 pages.
EPO Feb. 8, 2016 Extended Search Report and Written Opinion from European Application Serial No. 15183583.2.
3GPP TSG-RAN WG3 Meeting #73bis R3-112481, "Issues Related to Cell RACH Support for HNB Handover," Alcatel-Lucent, 3GPP Draft, Zhuhai, China, Oct. 10-14, 2011; 10 pages.
3GPP TSG-RAN3 Meeting #69 R3-102094, "Text Proposal for HNBRAP," Alcatel-Lucent, 3GPP Draft, Madrid, Spain, Aug. 23-27, 2010; 62 pages.
"3GPP TS 29.274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Tayal, "All About PDCCH and CCE Allocation—PDCCH (Physical downlink Control Channel)," Tayal's Way to Learn LTE, May 2013; 14 pages http://nitintayal-lte-tutorials.blogspot.com/2013/03/all-about-pdcch-and-ccc-allocation.html.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
Droms, R., "Dynamic Host Configuration Protocol," Network Working Group RFC 2131, Mar. 1997; 45 pages.
Leung, K., et al., "WiMAX Forum/3GPP2 Proxy Mobile IPv4," Independent Submission RFC 5563, Feb. 2010; 41 pages.
Narten, T., et al., "Neighbor Discovery for IP version 6 (IPv6)," Network Working Group RFC 4861, Sep. 2007; 97 pages.
U.S. Appl. No. 14/534,792, filed Nov. 6, 2014, entitled "System and Method for Providing Message Delivery and Paging to a Group of Users in a Network Environment," Inventors: Maulik Vijay Vaidya, et al.
U.S. Appl. No. 14/450,040, filed Aug. 1, 2014, entitled "System and Method for Media Access Control Scheduler for a Long Term Evolution Unlicensed Network Environment," Inventors: Rajesh S. Pazhyannur, et al.
U.S. Appl. No. 14/480,284, filed Sep. 8, 2014, entitled "System and Method for Internet Protocol Version-Based Multiple Access Point Name Support in a Network Environment," Inventors: Mark Grayson, et al.
U.S. Appl. No. 14/481,654, filed Sep. 9, 2014, entitled "System and Method for Supporting Cell Updates Within Small Cell Cluster for Mobility in Cell Paging Channel Mode," Inventors: Mickael Graham, et al.
U.S. Appl. No. 14/536,642, filed Nov. 9, 2014, entitled "System and Method for Radio Aware Traffic Management Based Wireless Authorization," Inventors: Ian McDowell Campbell, et al.
U.S. Appl. No. 14/534,883, filed Nov. 6, 2014, entitled "System and Method for Providing Message Delivery and Paging to a Group of Users in a Network Environment," Inventors: Maulik Vijay Vaidya, et al.
U.S. Appl. No. 14/597,036, filed Jan. 14, 2015, entitled "System and Method for Providing Collision-Avoided Physical Downlink Control Channel Resource Allocation in a Network Enviornment," Inventors: Qing Zhao, et al.
U.S. Appl. No. 14/612,827, filed Feb. 3, 2015, entitled "System and Method for Providing Policy Charging and Rules Function Discovery in a Network Environment," Inventors: Konstantin Livanos, et al.
U.S. Appl. No. 14/614,500, filed Feb. 5, 2015, entitled "System and Method for Providing Policy Charging and Rules Function Discovery in a Network Environment," Inventors: Konstantin Livanos, et al.
U.S. Appl. No. 14/450,040.
"LTE Quick Reference: CCE Index Calculation," LTE Handbook, Share Technote, http://www.sharetechnote.com/html/Handbook_LTE_CCE+Index.html First Published on or about Jul. 8, 2012.
EPO Jan. 29, 2016 Extended Search Report and Written Opinion from European Application Serial No. 15180616.
Gundavelli, M., et al., "Multiple APN Support for Trusted Wireless LAN Access," NETEXT-WG Internet Draft, draft-gundavelli-netext-multiple-apn-pmipv6-01.txt, Feb. 22, 2012; 15 pages.
"3GPP TS 23.402 V12.5.0 (Jun. 2014) Technical Specification: 3rd Generation Partnership Project; Technical Specification Group Services and System Aspects; Architecture enhancements for non-3GPP accesses (Release 12);" 3GPP, 650 Route des Lucioles; F-05921 Sophia-Antipolis Cedex, France; Jun. 2014; 291 pages.
SA-WG2 Meeting #92, S2-123194 (Revision of Sw-122735), Juniper Networks, Barcelona, Spain, Jul. 9-13, 2012; 13 pages.
EPO Mar. 11, 2016 Extended Search Report and Written Opinion from European Application Serial No. 15193713.
"3GPP TS 23.203 V7.3.0 (Jun. 1, 2007) Technical Specification: 3rd Generation Partnership Project; Group Services and System Aspects; Policy and charging control architecture (Release 7)," 3GPP, 650 Route des Lucioles; F-05921 Sophia-Antipolis Cedex, France; Jun. 1, 2007.
PCT Apr. 6, 2016 International Search Report and Written Opinion of the International Searching Authority from International Application No. PCT/US2016/013931.
"3GPP TS 29.213 V13.0.0 (Jan. 5, 2015) Technical Specification: 3rd Generation Partnership Project; Technical Specification Group Core Network and Terminals; Policy and Charging Control signalling flows and Quality of Service (QoS) parameter mapping (Release 13)," 3GPP, 650 Route des Lucioles; F-05921 Sophia-Antipolis Cedex, France; Jan. 5, 2015.
PCT Apr. 6, 2016 International Search Report and Written Opinion of the International Searching Authority from International Application No. PCT/US2016/013934.
3GPP TSG-CT WG3 Meeting #80, C3-150092, 29.213 CR0593, 3GPP Draft; Current Version 13.0.0; Huawei, et al.; Sorrento, Italy Feb. 2-6, 2015.
EPO Apr. 28, 2016 Extended Search Report and Written Opinion from European Application Serial No. 15195895.
EPO Jun. 7, 2016 Extended Search Report and Written Opinion from European Application Serial No. 16150351.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
U.S. Appl. No. 14/534,792.
U.S. Appl. No. 14/480,284.
U.S. Appl. No. 14/481,654.
U.S. Appl. No. 14/536,642.
U.S. Appl. No. 14/534,883.
U.S. Appl. No. 14/597,036.
U.S. Appl. No. 14/612,827.
U.S. Appl. No. 14/614,500.

\* cited by examiner

FIG. 2

SYSTEM AND METHOD FOR PROVIDING COLLABORATIVE NEIGHBOR MANAGEMENT IN A NETWORK ENVIRONMENT

CROSS-REFERENCE TO RELATED APPLICATION

This application claims the benefit of priority under 35 U.S.C. §119(e) to U.S. Provisional Application Ser. No. 62/088,254 entitled "SYSTEM AND METHOD FOR PROVIDING COLLABORATIVE NEIGHBOR MANAGEMENT ACROSS A SET OF PEER NEIGHBORS IN A NETWORK ENVIRONMENT" filed Dec. 5, 2014, which is hereby incorporated by reference in its entirety.

TECHNICAL FIELD

This disclosure relates in general to the field of communications and, more particularly, to a system and method for providing collaborative neighbor management in a network environment.

BACKGROUND

Networking architectures have grown increasingly complex in communication environments. For example, small cells have gained notoriety due to their capabilities to connect wireless devices to a mobile operator's network. In general terms, small cell access points can operate in a licensed spectrum to connect user equipment to the network, often using broadband connections. For a mobile operator, small cell access points can offer improvements to both coverage and capacity, which is particularly applicable to indoor networking environments where macro cell networks typically suffer coverage limitations. Small cell access points can also offer an alternative networking architecture to deliver the benefits of scalable small cell deployments. However, there are significant challenges in managing neighbor relationships for small cell architectures in order to provide mobility across neighboring cells.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and may include populating a neighbor list including one or more neighbors for a cell radio using neighbor information gathered for the cell radio; receiving a detected set measurement report from a user equipment (UE), wherein the measurement report includes, at least in part, one or more primary scrambling codes (PSCs) for one or more other neighbors detected by the UE; and updating the neighbor list to include one or more of the other neighbors based, at least in part, on whether any of the one or more PSCs received in the measurement report are included in the previously gathered neighbor information. In some instances, the neighbor list can include, at least in part, a cell ID and a PSC for each of the neighbors. In some cases, the method can include enabling detected set measurement reporting for the UE.

In some instances, the neighbor information can include at least one of: a peer access points (APs) table including peer cell radios discovered in a grid for the cell radio using a grid discovery process; a peer neighbors table including neighbors discovered by the peer cell radios outside the grid for the cell radio; and a network listen table including neighbors detected over-the-air by the cell radio. In some cases, the updating can include ranking the neighbors in the neighbor list. In some cases, the ranking can include providing top priority to the other neighbors for which PSC(s) were received from the UE.

In some cases, the method can include performing a lookup against the neighbor information using the one or more PSCs from the measurement report. In still other cases, the method can include: for each of a corresponding PSC located in a given neighbor information table, comparing measurement information for the corresponding PSC against qualification criteria; and updating the neighbor list to include the corresponding PSC if the measurement information meets or exceeds the qualification criteria. In some instances, the qualification criteria can be associated with a measurement of at least one of: a received chip energy to noise (Ec/No) ratio received by the UE associated with the corresponding PSC; and a received signal code power (RSCP) associated with the corresponding PSC. In still other cases, the method can include repeating the updating for any subsequent detected set measurement reports received from the UE.

Example Embodiments

Figure 1:
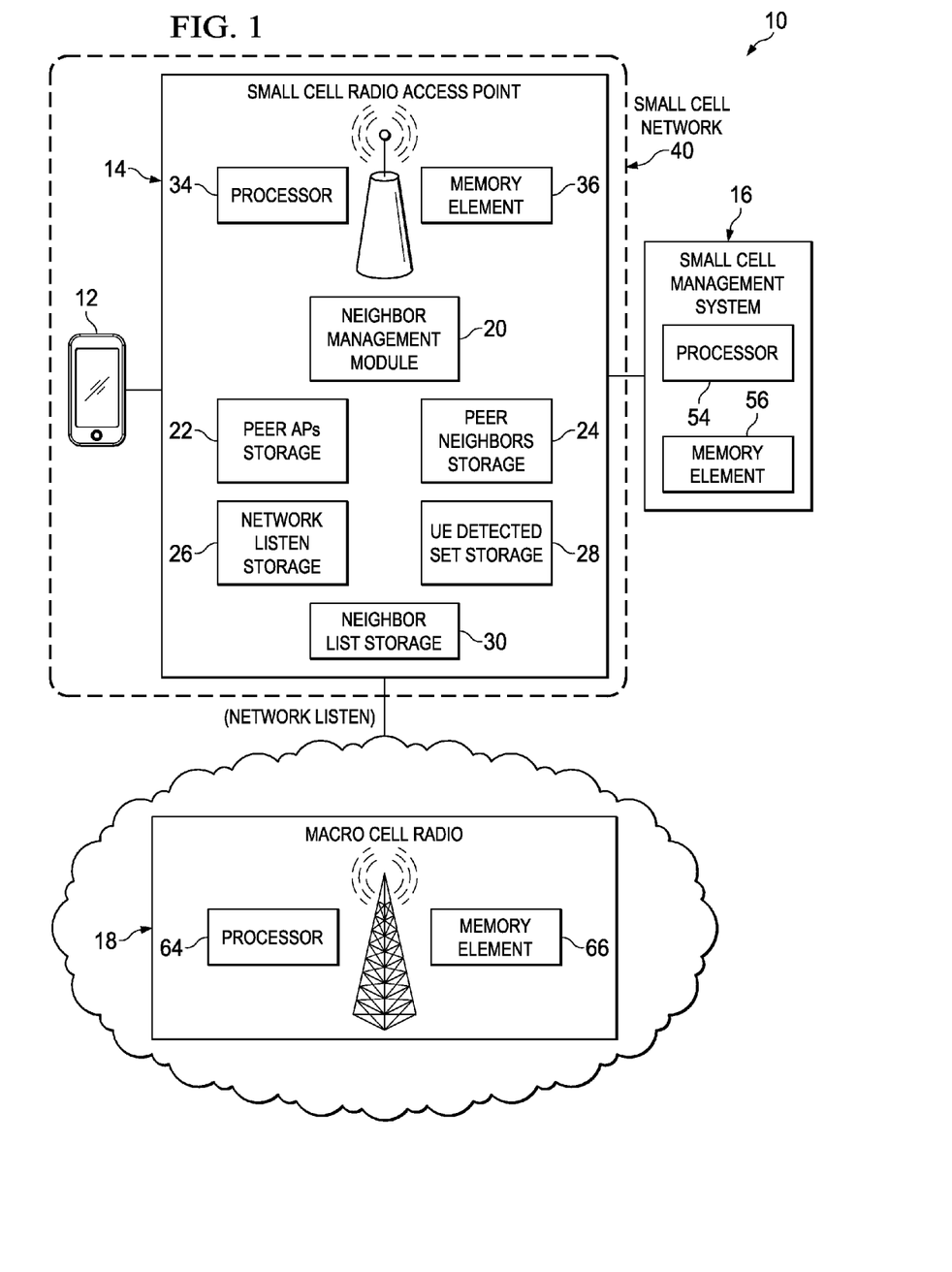
FIG. 1 is a simplified block diagram illustrating a communication system to facilitate providing collaborative neighbor management in a network environment according to one embodiment of the present disclosure.

Turning to FIG. 1, FIG. 1 is a simplified block diagram illustrating a communication system 10 to facilitate providing collaborative neighbor management in a network environment according to one embodiment of the present disclosure. The example architecture of FIG. 1 includes user equipment (UE) 12, a small cell radio access point (AP) 14 included within a small cell network 40, a small cell management system (MS) 16 and a macro cell radio 18. As referred to herein in this Specification, a small cell radio AP (e.g., small cell radio AP 14) may also be referred to interchangeably as a 'small cell', 'small cell AP', 'femtocell' or 'femto'. Small cell radio AP 14 may include a processor 34, a memory element 36, a neighbor management module 20, a peer APs storage 22, a peer neighbors storage 24, a network listen storage 26, a UE detected set storage 28 and a neighbor list storage 30. Small cell radio AP 14 may interface with small cell management system 16, which may include a processor 54 and a memory element 56. Macro cell radio 18 may include a processor 64 and a memory element 66. Note a 'macro cell radio' (e.g., macro cell radio 18) may be referred to interchangeably herein in this Specification as a 'macro cell'.

In certain embodiments, FIG. 1 could represent a 3rd Generation Partnership Project (3GPP) 2G and/or 3G architecture for General Packet Radio Service (GPRS) and/or Circuit Switched (CS) services. Alternatively, the depicted architecture may be applicable to other environments equally. Although only one small cell radio AP (e.g., small cell radio AP 14) is shown in FIG. 1, it should be understood that small cell network 40 can include multiple small cell radio APs deployed in the network, for example, hundreds or more small cell radio APs. Additionally, multiple macro cells can also be deployed in the system. As referred to herein in this Specification, a 'small cell network' (e.g., small cell network 40) can also be referred to interchangeably as a 'grid' or 'small cell grid'.

One or more protocols may exist within the architecture such that broadcasting can occur between various elements within the system to optimize system operation. For example, a system information block (SIB) protocol could be used to broadcast resource information within the system. For example, a SIB broadcast from small cell radio AP 14 could indicate the primary scrambling code (PSC) used by small cell radio AP 14 as well as PSC(s) for one or more neighbor small cell radio APs and/or macro cell radio 18. Each small cell radio AP in small cell network 40 (e.g., small cell radio AP 14) can be allocated a primary scrambling code (PSC) and a cell identification (ID). In general, PSCs provide a technique for resource separation to enable co-existence between different small cell radio APs within a small cell network and/or between small cell radio APs and macro cells within a communication system. In various embodiments, the PSC for small cell radio AP 14 can be allocated by small cell management system 16. Small cell radio AP 14 and small cell management system 16 can also interact in order to exchange data involving Internet protocol (IP) communications (e.g., data associated with technical report (TR)-069 protocol and/or the TR-196 data model).

Small cell network 40 represents a series of points or nodes of interconnected communication paths for receiving and transmitting packets of information that propagate through communication system 10. Small cell network 40 may offer communicative interfaces between UE 12 and selected nodes in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. Small cell network 40 may implement a user datagram protocol (UDP)/Internet protocol (UDP/IP) connection and use a transmission control protocol (TCP/IP) communication language protocol in particular embodiments of the present disclosure. However, small cell network 40 may alternatively implement any other suitable communication protocol for transmitting and receiving data packets within communication system 10.

Small cell network 40 may include a given coverage area for servicing multiple end users and for managing their associated connectivity. For example, small cell network 40 can represent multiple small cell radio APs, which can provide access to a group of UE 12. In certain embodiments, small cell network 40 can be provided in an enterprise environment, which may provide coverage for multiple users, clients, etc. within a building or other structure such facility. In various embodiments, a macro network including one or more macro cells (e.g., macro cell radio 18) could overlap with and/or include small cell network 40.

In various instances, small cell network 40 (including small cell radio AP 14) and macro cell radio 18 may operate to provide coverage for radio access networks (RANs) such as, for example, GSM EDGE radio access network (GERAN), UMTS terrestrial radio access network (UTRAN), generally referred to as 3G. In one or more embodiments, macro cell radio 18 may be deployed as a Node B (NodeB), which may be in communication with a radio network controller (RNC) to provide macro 3G cellular/mobile coverage for one or more UE within communication system 10. As referred to herein in the present Specification the term 'macro network' can be used interchangeably with 'macro cell network' and 'macro cell RAN.'

In one or more embodiments, small cell radio AP 14 may be deployed as a Home Node B (HNB) small cell 3G cellular/mobile coverage for one or more UE (e.g., UE 12) within a coverage area of small cell network 40 using any appropriate protocol or technique. Note, although the present disclosure is described with reference to 2G and 3G architectures, small cell radio AP 14 could also be provisioned in one or more embodiments as 'dual stack' devices to include capabilities to provide cellular/mobile coverage for 4G or Long Term Evolution (LTE) RANs, such as, for example, evolved UTRAN (E-UTRAN). In other embodiments, small cell AP may be implemented as a 'triple stack' device to provide wireless coverage for Wi-Fi, Bluetooth™ and/or WiMAX wireless communications.

Also shown in FIG. 1, small cell radio AP 14 may include neighbor management module 20 which may interface with peer APs storage 22, peer neighbors storage 24, network listen storage 26, UE detected set storage 28 and neighbor list storage 30 to facilitate the collaborative neighbor management operations described herein. Small cell radio AP 14 may be provided with capabilities such that, upon initialization, it may discover and/or be provided with a peer APs list including one or more small cell radio APs, which may be considered peer APs within small cell grid for small cell radio AP 14. At a minimum, the peer APs list may include PSC(s) and cell IDs for the peer APs. In at least one embodiment, the peer APs list for small cell radio AP 14 may be provided to or retrieved by small cell radio AP 14 via small cell management system 16.

During their respective power-on and/or initialization, each small cell AP in small cell network 40 may exchange carrier information and/or cell information via local IP communications within small cell network 40. The local IP communications can be exchanged to enable small cell radio APs within the small cell network 40 to be discovered by other small cell APs in small cell network 40. The process of exchanging information between APs is typically referred to as a grid discovery process. In various embodiments, a grid discovery process may rely entirely or partially on peer-to-peer communication between small cell APs and/or may rely completely on centralized elements that consolidate the topology of the grid and facilitate distribution of the neighbor information to each small cell AP in the grid. In various embodiments, carrier information and cell information can include, but not be limited to a UMTS terrestrial radio access (UTRA) absolute radio frequency channel number (UARFCN), primary scrambling code (PSC) and cell ID.

For example, during power-on and/or initialization, small cell radio AP 14 may discover using IP communications exchanged via a grid discovery process peer small cell radio APs (or other cell radios) in small cell network 40 included in its peer APs list and may store the discovered peer small cell radio APs in one or more peer APs table(s) in peer APs storage 22. Small cell radio APs in small cell network 40 may also exchange information related to other macro cells and/or small cell radio APs, which they may have discovered in communication system 10 (e.g., internal or external to small cell network 40) via various IP discovery communications. Small cell radio APs discovered, detected and/or communicated to small cell radio AP 14 by peer cell radio APs, which were not discovered by small cell radio AP through its grid discovery process may be stored one or more peer neighbors table(s) in peer neighbors storage 24.

Small cell radio AP 14 may also discover macro cells and/or small cells in communication system 10 using network listen (NWL) techniques. During initialization or other times during small cell radio AP 14 operation, small cell radio AP 14 can use its receiver to perform network listen functions such as, for example radio environment monitoring (REM) scans and/or network sniffing techniques to detect inter-radio access technology (RAT) cells, intra-frequency cells (e.g., cells having a same carrier frequency as small cell radio AP 14) and/or inter-frequency cells (e.g., cells having a different carrier frequency than small cell radio AP 14). Cells detected using NWL techniques can be stored in one or more network listen table(s) in network listen storage 26. Note as referred to herein in this Specification peer APs tables, peer neighbors tables and network listen tables can collectively be referred to as neighbor information or neighbor information tables.

In certain embodiments, small cell radio AP 14, upon initialization, may use the cell information contained within peer APs storage 22, peer neighbors storage 24 and network listen storage 26 to determine an initial neighbor list, which can be stored in neighbor list storage 30. The initial neighbor list may be used by small cell radio AP 14 to derive SIB 11 reselection candidates and handout candidates, each of which can be broadcast to one or more UE (e.g., UE 12) attached to small cell radio AP 14. In general, SIB 11 reselection candidates can include up to 32 intra-frequency cells, up to 32 inter-frequency cells and up to 32 inter-RAT cells, for which idle mode UE can reselect. In general, handout candidates can include intra-frequency cells, inter-frequency cells and/or inter-RAT cells as candidates for handout operations (e.g., handout from small cell radio AP 14 to a macro cell, such as, for example, macro cell radio 18). UE detected set storage 28 will be discussed in further detail below.

Before detailing some of the operational aspects of FIG. 1, it is important to understand common characteristics of neighbor relationships as generally configured in commercial architectures. The following foundation is offered earnestly for teaching purposes only and, therefore should not be construed in any way to limit the broad teachings of the present disclosure. In many network architectures, small cell radio APs can be deployed as autonomous units to improve reception in areas with poor coverage, or within buildings where coverage is reduced by the structure itself.

Essentially, small cell radio APs are fully featured base stations that can provide proximate coverage in a business (e.g., enterprise) and/or residential environment. Typically, small cell APs operate at lower radio power levels as compared to macro cell RANs. Small cell radio APs can be connected using a standard broadband digital subscriber line (DSL), internet or cable service into a service provider's network. Calls can be made and received, where the signals are sent (potentially encrypted) from the small cell radio AP via the broadband IP network to one of the service provider's main switching centers. Small cell radio APs can be provisioned to readily handle 8, 16, 32, etc. concurrent calls. Thus, a small cell radio AP (e.g., an HNB) generally operates as a mini tower for a proximate user. As used herein in this Specification, the terms 'user' and 'subscriber' may be used interchangeably.

In licensed radio access technologies, neighbor relations need to be configured in order to facilitate mobility across neighboring cells. Traditionally, the macro network context, neighbor relations have been set up manually. Network listen was introduced to enable automatic neighbor relation management for small cells. With network listen, small cells can decode neighbor information using a local receiver. 3GPP also standardized mechanisms for automatic neighbor relation (ANR) management using user equipment to assist with neighbor management. Using these mechanisms, a licensed small cell radio access point can request UEs to decode and report information related to neighboring cells.

For example, intra-frequency detected set reporting has been available as an optional user equipment capability since 3GPP Release 99. It is estimated that the vast majority of commercial UEs available today support this capability. Inter-frequency UE detected set reporting was introduced in 3GPP Release 9. To enable Detect Set reporting, a small cell radio AP can request (via Radio Resource Control (RRC) measurement control signaling) any connected mode UEs to report intra-frequency and/or inter-frequency detected set measurements. UEs supporting detected set measurement and reporting will then report, in an RRC Measurement Report, any detected Primary Scrambling Codes (PSCs) that are outside of an advertised (e.g., broadcast) (active and monitored) neighbor list.

PSCs identify cells at the physical layer, but this is not unique network-wide. A neighbor relation is therefore not complete until the unique cell identity of the neighboring cell is acquired. Up to 3GPP Release 9, UEs will only report the PSC (and associated measurements) of the detected cell(s). 3GPP technical specification (TS) 36.133 (Release 9) provides that UE measurement and reporting requirements for detected intra-frequency cells includes that a given UE should be capable of common pilot channel (CPICH) measurements for at least one (1) detected intra-frequency cell in a detected set, and that the UE physical layer should be capable of reporting measurements to higher layers with a measurement period of ten (10) seconds.

3GPP TS 36.331 allows inclusion of up to 32 intra-frequency neighbors in the measurement report. 3GPP Release 9 also introduces an optional support for a "System Information (SI) Acquisition for Handover (HO)" capability (e.g., for intra-frequency, inter-frequency and/or E-UTRA handovers/handouts). UEs supporting this capability can be requested to decode the neighbor cell identity. Most UEs in the field, however, do not yet support this capability. Obtaining this information from UEs is also time consuming, and relies on UEs having opportunities to decode system information for neighboring cells. This can be difficult to achieve, particularly for inter-frequency and inter-RAT neighbors as the UE is typically at the cell edge when compressed mode is activated and in these conditions handover becomes time critical. As used herein in this Specification, the term 'handout' is used to indicate handout from a small cell AP to a macro cell radio while the term 'handover' can generally be used to indicate both handover between small cell APs, which may be present in the small cell network, and/or handover (e.g., handout) between a small cell AP and a macro cell radio.

Accordingly, there are several problems with current mechanisms for providing neighbor relation management. First, manual neighbor relation management is expensive and does not scale. Second, network listen can only support neighbors that are visible to the local receiver on the access point. UEs may detect neighbors that are not visible to the local receiver due to local RF blocking or due to large path losses between the UE and the access point. Third, UE assisted neighbor relations management relies on state-of-the art (at least 3GPP Release 9 compliant) UEs and also requires the use of closed subscriber group identities (CSG IDs).

In general, small cell radio APs can be provisioned to accommodate different access modes; e.g., modes through which resources (e.g., coverage, services, etc.) can be provided and/or limited to subscribers within range of a small cell radio AP. In Open Access Mode deployments, resources provided by a small cell radio AP is generally open to anyone within range; unless configurations operate to limit access to a given network to only those subscribers duly authorized for access to a given service provider network. In Closed Access Mode deployments, resources provided by a small cell AP are limited to subscribers within range and that are included in a closed subscriber group (CSG) for the small cell AP. Small cell APs can also be provisioned in Hybrid Access mode in which resources can be differentiated between Closed and Open portions of a small cell AP.

In accordance with various embodiments described herein, communication system 10 is configured to address these issues (and others) in offering a system and method for providing collaborative neighbor management using, at least in part, one or more of: neighbors discovered locally for a given cell radio, information exchanged across peers forming a proximity area network (e.g., a Self-Organizing Network (SON)) and/or UE measurements. In certain embodiments, communication system 10 may further provide a system and method to form a prioritized neighbor relations table (e.g., a neighbor list), which can be used for mobility purposes within the system. In at least one embodiment, the methods described herein can be executed by a hardware processor of a given cell radio (e.g., small cell radio AP 14).

During operation, one or more small cell radio APs (e.g., small cell radio AP 14) can exchange neighbor information collected through network listen and local neighbor grid discovery with other peers that form a grid (e.g., small cell network 40) of local small cell access points. This information can then be used to populate a local directory service of neighbors (e.g., an initial neighbor list), which can be composed of: peer APs and peer neighbors. In certain embodiments, peer APs can include peer cell radio detected and/or discovered for a grid by a given small cell radio AP through a grid discovery process and peer neighbors can include cells discovered by peer cell radios that were not discovered by the given small cell radio AP through discovery of the grid.

Each small cell radio AP (e.g., small cell radio AP 14) on the grid can request one or more UEs (e.g., UE 12) to include detected set cells in their measurement report(s). The detected set cells can be stored in UE detected set storage 28. Small cell radio AP 14, via neighbor management module 20, can then use the PSC(s) reported by UE 12 as a key for a lookup on peer AP and peer neighbors tables, which can be stored in peer APs storage 22 and peer neighbors storage 24, respectively.

In at least one embodiment, any lookup success for a given PSC (e.g., the PSC is located in the peer APs or peer neighbors tables) may result in the initial neighbor list being updated to include the PSC received in a given UE detected set. In at least one embodiment, the neighbor list may be updated by reordering or ranking neighbors following a lookup success for a given PSC received in a given UE detected set in which the PSC (or PSCs) may be ranked as a top candidate for reselection and/or handout in the neighbor list.

In at least one embodiment, one or more returned PSC(s) received in a given UE detected set may be compared against a threshold qualification before performing the lookup on the peer APs and peer neighbors tables. In certain embodiments, the threshold qualification may include determining whether one or more measurements included in a given measurement report associated with the UE detected set are above a certain decibel (dB) threshold. In one or more embodiments, the measurements can include CPICH received chip energy to noise (Ec/No) ratio, Received Signal Code Power (RSCP) and pathloss.

Accordingly, embodiments provided by communication system 10 may simplify the task of managing neighbor relations on small cell APs and may remove dependencies on Release 9 capability that is optional for UEs. In certain embodiments, one or more of the following assumptions may exist: for peer APs, UEs are likely to detect other APs in the local grid (e.g., in small cell network 40); for peer neighbors, UEs are likely to detect other neighbors that other APs on the grid have detected.

During operation, small cell radio AP 14 on a grid (e.g., small cell network 40) can populate its neighbor information tables (e.g., peer APs table, peer neighbors table, network listen table) upon power-on and/or initialization using neighbor information gathered through network listen and/or IP LAN grid discovery communications or exchanges with neighboring cell radios (e.g., peers and neighbors of peers). Small cell radio AP 14 can use the tables to populate an initial neighbor list. The initial neighbor list on small cell radio AP 14 will be provisioned to include, in addition to neighbors detected via the local network listen, as many other neighbors in the peer APs and peer neighbors tables discovered though IP LAN exchanges with other cell radios in the network as possible. This process may be referred to herein in this Specification as 'sharing neighbors'. As the capacity of the neighbor list may be limited and as the number of small cell radio APs, which can be deployed in small cell network 40 can extend into the hundreds, not all relevant neighbors may make it to the initial list. Also, some unnecessary neighbors may be included in the initial list. By 'initial' it is meant that the initial neighbor list can be populated by small cell radio AP 14 using neighbor information gathered during power-on and/or initialization and then this initial neighbor list can be updated using detected set measurement report information for certain UE detected neighbors.

Upon entering a coverage area of a small cell radio AP (e.g., upon detecting small cell radio AP 14), UE 12 can begin to set-up RRC connections with small cell radio AP 14. Upon establishing a connection with UE 12, small cell radio AP 14 can request UE 12 to include detected set cells in its measurement report(s) communicated to small cell radio AP 14. Subsequently, UE 12 can include PSC(s) for any detected set neighbors in its measurement report(s) to small cell radio AP 14. Upon receiving a detected set measurement report from UE 12, small cell radio AP 14 can perform a lookup for any new PSC(s) reported by the UE against the lookup tables set up during power-on/initialization. This process may be referred to herein in this Specification as determining missing neighbors for the neighbor list for small cell radio AP 14. In certain embodiments, prior to performing the lookup, small cell radio AP 14 may compare one or more measurements included in the detected set measurement report from UE 12 against one or more qualification criteria to determine whether or not to proceed with the lookup. In various embodiments, the qualification criteria can include, but not be limited to, the qualification criteria can include comparing received chip energy to noise (Ec/No) ratio received by the UE associated with a corresponding PSC for a corresponding UE detected neighbor against a configured Ec/No threshold and/or comparing received signal code power (RSCP) associated with a corresponding PSC for a corresponding UE detected neighbor against a configured RSCP threshold. In various embodiments, the qualification criteria and corresponding thresholds can be set and/or configured by a network operator, equipment manufacturer, vendor, combinations thereof or the like.

Returning the general operation of communication system 10, in the event of a lookup success, small cell radio AP 14 (e.g., via neighbor management module 20) can update its neighbor list to include the returned neighbor(s) (e.g., updated the initial neighbor list to include a PSC and cell ID for each returned neighbor). In certain embodiments, small cell radio AP 14 can reorder or rank neighbors in the neighbor list based on returned neighbor(s). In at least one embodiment, ranking can include ranking UE detected/returned neighbors highest in the neighbor list over other neighbors already present in the list. In certain embodiments, small cell radio AP 14 can also use UE detected set measurement reports to identify any redundant neighbors in the neighbor list, for example, to remove redundant neighbors from the list. In certain embodiments, neighbors that are persistently not visible in UE measurement reports may be considered eligible for removal from the neighbor list and small cell radio AP 14 can remove any neighbors from the neighbor list that are considered eligible for removal.

Some particular embodiments may provide one or more of the following advantages: remove the need for manual neighbor management; add more robustness to neighbor management as compared to using local network listen alone; expedite neighbor relationship bootstrapping (e.g., small cell management system 16 applying or configuring neighbors based on the topology that a give small cell radio AP 14 is positioned in); and/or minimize reliance on UE capabilities (e.g., not needing UEs to be at least 3GPP Release 9 compliant).

In various embodiments, UE 12 can be associated with users, employees, clients, customers, etc. wishing to initiate a flow in communication system 10 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 10. UE 12 may also be inclusive of a suitable interface to a human user such as a microphone, a display, a keyboard, or other terminal equipment.

UE 12 may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12 may have a bundled subscription for network access and application services (e.g., voice), etc. Once the access session is established, the user can register for application services as well, without additional authentication requirements. UE IP addresses can be assigned using dynamic host configuration protocol (DHCP), Stateless Address Auto-configuration, default bearer activation, etc., or any suitable variation thereof.

As shown in FIG. 1, small cell radio AP 14 includes processor 34 and memory element 36; small cell management system 16 includes processor 54 and memory element 56; and macro cell radio 18 includes processor 64 and memory element 66. Additionally, small cell radio AP 14 further includes neighbor management module 20, peer APs storage 22, peer neighbors storage 24, network listen storage 26, UE detected set storage 28 and neighbor list storage 30. Hence, appropriate software and/or hardware is being provisioned in small cell radio AP 14, small cell management system 16 and macro cell radio 18 in order to facilitate providing collaborative neighbor management using the techniques describe herein in the network environment. Note that in certain examples, certain storage (e.g., peer APs storage 22, peer neighbors storage 24, network listen storage 26, UE detected set storage 28 and/or neighbor list storage 30) can be consolidated with memory elements (or vice versa), or the storage can overlap/exist in any other suitable manner.

In one example implementation, small cell radio AP 14, small cell management system 16 and macro cell radio 18 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate collaborative neighbor management activities (e.g., for networks such as those illustrated in FIG. 1). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of small cell radio AP 14, small cell management system 16, and macro cell radio 18 can include memory elements (e.g., memory element 36, 56, 66, respectively) for storing information to be used in achieving the collaborative neighbor management operations, as outlined herein. Additionally, each of these devices may include a processor (e.g., processor 34, 54, 64, respectively) that can execute software or an algorithm to perform the collaborative neighbor management activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to small cell radio AP 14, small cell management system 16 and macro cell radio 18 could be provided in any database, register, control list, cache, or storage structure: all of which can be referenced at any suitable timeframe. Any such storage options may be included within the broad term 'memory element' as used herein. Similarly, any of the potential processing elements, modules, hardware and machines described herein should be construed as being encompassed within the broad term 'processor'. Each of the network elements and user equipment (e.g., mobile nodes) can also include suitable interfaces for receiving, transmitting, and/or otherwise communicating data or information in a network environment.

Note that in certain example implementations, the collaborative neighbor management operations as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described herein. A processor, including a hardware processor, can execute any type of instructions associated with the data to achieve the operations detailed herein. In one example, the processors [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 2:
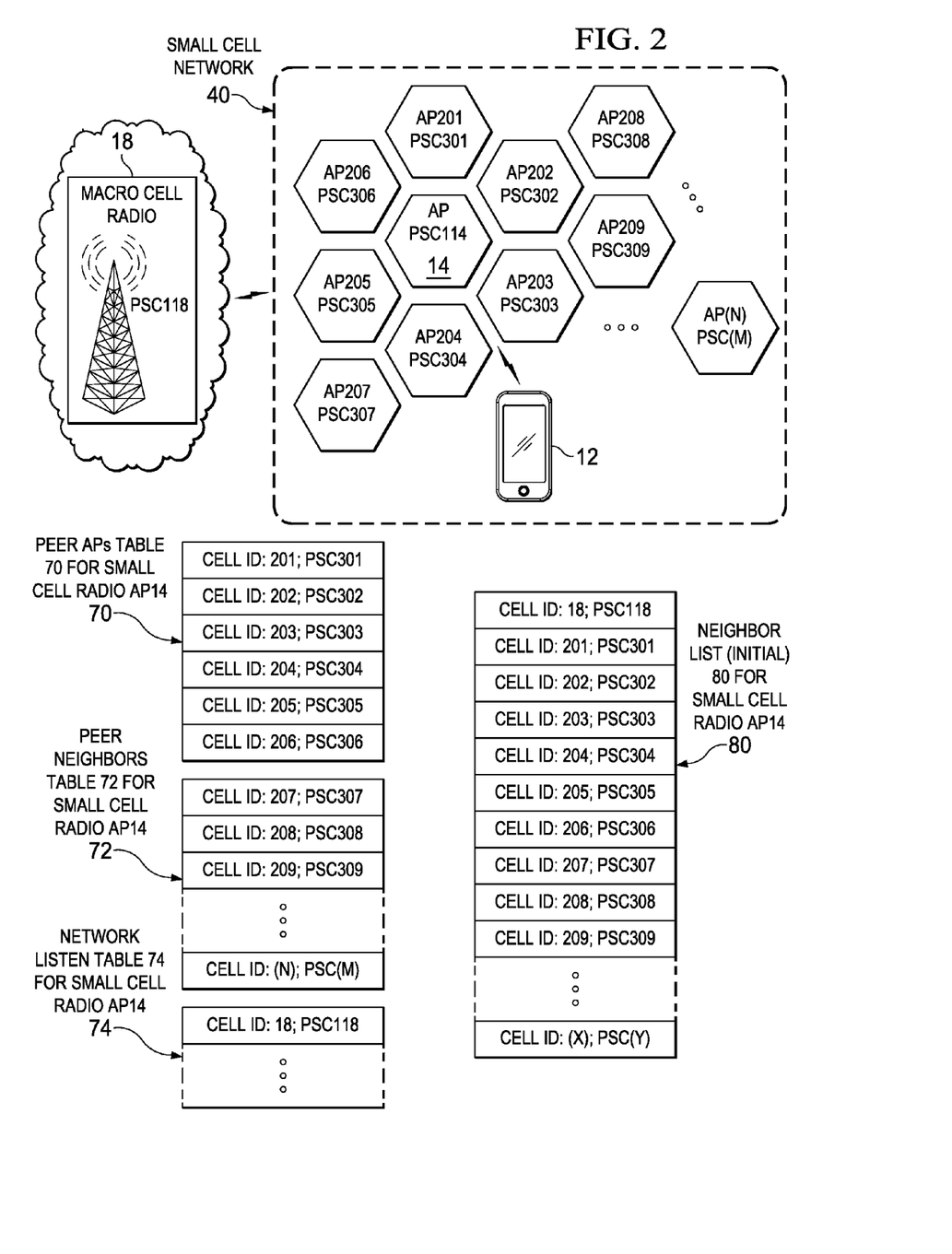
FIG. 2 is a simplified schematic diagram illustrating example details associated with providing collaborative neighbor management in accordance with one potential embodiment of the communication system.

Referring to FIG. 2, FIG. 2 is a simplified schematic diagram illustrating an example network listen and grid discovery use case for small cell network 40 in accordance with one embodiment of communication system 10. FIG. 2 includes UE 12, small cell radio AP 14, a plurality of neighboring small cell radio APs AP201-AP(N) and macro cell radio 18. Also shown in FIG. 2 is a peer APs table 70 for small cell radio AP 14, which may be stored in peer APs storage 22, a peer neighbors table 72, which may be stored in peer neighbors storage 24, a network listen table 74, which may be stored in network listen storage 26, and an 'initial' neighbor list 80, which can be stored in neighbor list storage 30.

In general, FIG. 2 illustrates an example network listen and grid discovery use case, which can be used by small cell radio AP 14 to populate its initial neighbor list 80 following power-on and/or initialization of small cell radio AP 14. For FIG. 2, it is assumed that small cell radio AP 14 has been allocated a PSC 114 and each of AP201-AP(N) have been allocated a corresponding PSC, PSC301-PSC(M), respectively. Additional assumptions may exist for the use case illustrated in FIG. 2 including: small cell radio AP 14 is identified by a cell ID 14; each of small cell radio APs AP201-AP(N) are identified by respective cell IDs 201-(N); macro cell radio 18 is identified by a cell ID 18 and has been allocated a PSC118; small cell radio APs AP201-AP206 are included in the peer APs list for small cell radio AP 14; UE 12 is attached to small cell radio AP 14 and UE detected set reporting has not yet been enabled for UE 12, thus no UE detected set PSCs have yet been received from UE 12.

As illustrated in FIG. 2, following power on of the small cell radio APs in small cell network 40, small cell radio AP 14 may exchange IP communications with small cell radio APs AP201-AP(N) to facilitate grid discovery for each of peer small cell radio APs AP201-AP206 included in the peer APs list for small cell radio AP 14. The exchange of IP communications may also facilitate discovery of peer neighbor small cell APs AP207-AP(N) not discovered by small cell radio AP through its grid discovery process (e.g., peer neighbors that were not included in the peer APs list for small cell radio AP 14). Small cell radio AP 14 may store the corresponding cell ID and PSC for each of corresponding peer small cell radio APs AP201-AP206 in peer APs table 70. Small cell radio AP 14 may store the corresponding cell ID and PSC for each of corresponding neighbor peer small cell radio APs AP207-AP(N) in peer neighbors table 72. Using various network listening techniques via its receiver, small cell radio AP 14 may also detect macro radio cell 18 and may store the corresponding cell ID and PSC for macro cell radio 18 in network listen table 74. Note other cell IDs can be populated in the network listen table 74 for other cell radios that may be detected by small cell radio AP 14. It should be understood that other information (e.g., carrier information, etc.) for each of small cell radio APs AP201-AP(N) and/or macro cell radio 18 can be stored in peer APs table 70, peer neighbors table 72 and/or network listen table 74.

Using the cell information (e.g., cell ID, PSC) stored in each of peer APs table 70, peer neighbors table 72 and network listen table 74, small cell radio AP 14 may populate its initial neighbor list 80 to include as many of the cells contained in these corresponding tables as possible, given any storage constraints for neighbor list storage 30. As shown in FIG. 2, the initial neighbor list 80 can include cell ID 18 and PSC118 for macro radio cell 18, cell IDs 201-206 and corresponding PSC, PSC301-PSC306 for peer small cell APs AP201-AP206, and cell IDs 207-(X) [where X is less than or equal to N] and corresponding PSCs, PSC307-PSC (Y) [where Y is less than or equal to M]. Because the size of neighbor list storage 30 may be limited, small cell AP may not be able to populate neighbor list 80 with every cell ID and PSC identified in peer APs table 70 and/or peer neighbors table 72. In certain embodiments, small cell radio AP 14 can use neighbor list 80 to select cells as SIB 11 reselection candidates and/or handout candidates.

Thus, as shown in FIG. 2, small cell radio AP 14 can populate peer APs table 70, peer neighbors table 72, network listen table 74 and (initial) neighbor list 80 upon power-on and/or initialization. During operation, once small cell radio AP 14 enables detected set measurements for UE 12, small cell radio AP 14 can update the initial neighbor list 80 based, at least in part, on performing a lookup in peer APs table 70 and peer neighbors table 72 using PSCs received in UE detected set measurement reports received from UE 12 to determine any updates to the initial neighbor list. Operations which can be used by a cell radio (e.g., small cell radio AP 14) to update its neighbor list are best understood in the context of various example sequences, which have been provided in FIGS. 3 and 4.

Figure 3:
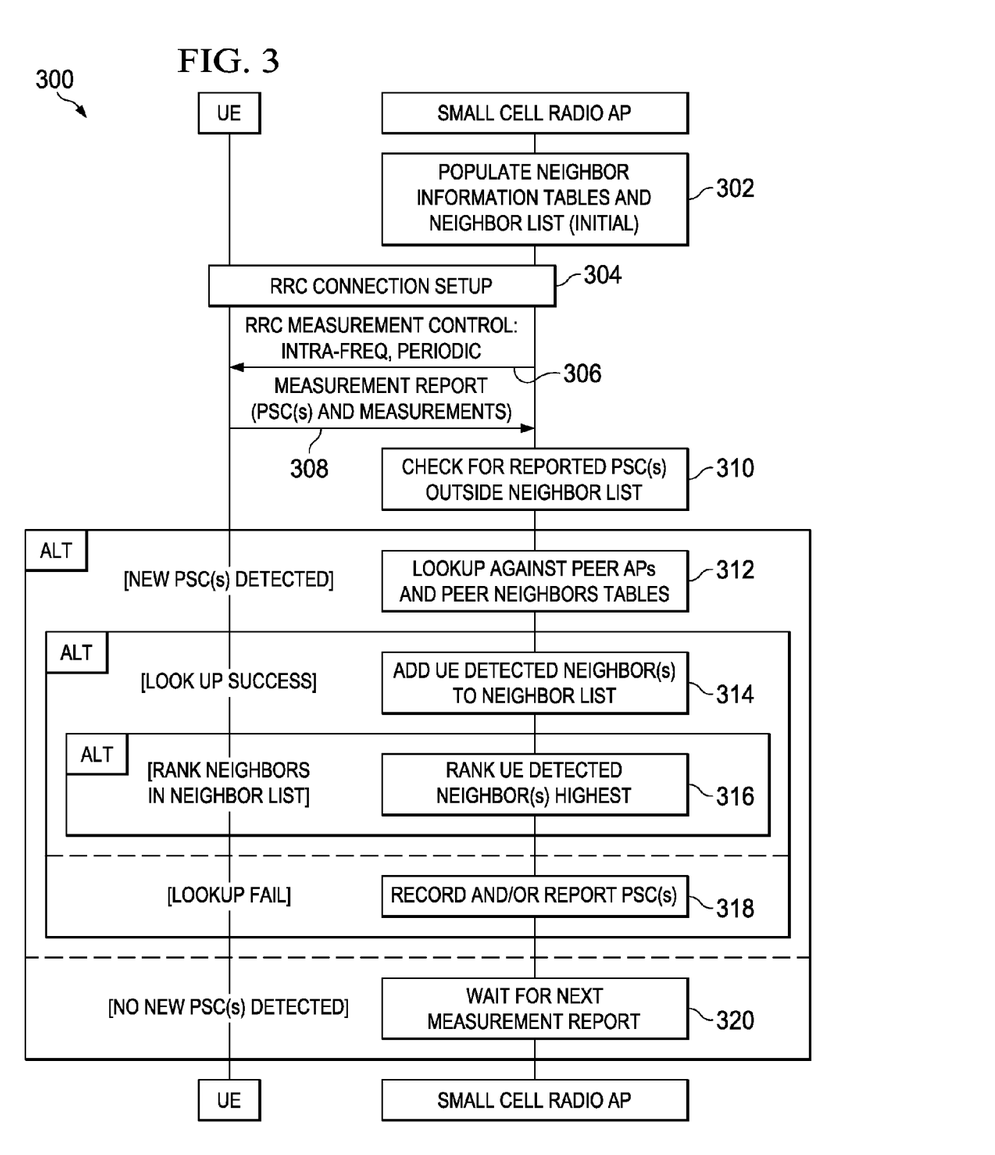
FIG. 3 is simplified sequence diagram illustrating example operations associated with providing collaborative neighbor management in a network environment in accordance with one potential embodiment of the communication system.

FIG. 3 is simplified sequence diagram illustrating example operations 300 associated with providing collaborative neighbor management in a network environment in accordance with one potential embodiment of the communication system. In various embodiments, operations 300 can be performed by a given UE (e.g., UE 12) and a given cell radio (e.g., small cell radio AP 14 via neighbor management module 20). Upon power-on and/or initialization, small cell radio AP 14 can populate its neighbor information tables (e.g., peer APs table, peer neighbors table, network list table) using neighbor information gathered in communication system 10 (e.g., using grid discovery, network listen, etc.) and can populate its initial neighbor list based on information contained in these tables as shown at 302. As the storage capacity for the neighbor list for small cell radio AP 14 may be limited, not all neighbors for small cell radio AP 14 may be included in the initial neighbor list.

At any time a UE 12 can enter a coverage area for small cell radio AP 14 and may seek to establish a connection with small cell AP and, at 304, an RRC connection setup can be exchanged between UE 12 and small cell radio AP 14. At 306, small cell radio AP 14 may enable detected set measurement reporting for UE 12 via RRC measurement control signaling. In various embodiments, the detected set measurement reporting can be enabled for intra-frequency measurements at a given periodic rate. In various embodiments, the periodic rate vary depending on configuration by a network operator, equipment manufacturer, vendor combinations thereof or the like and can range from approximately 50 to 16000 msec. In various embodiments, shorter periods may be used during system initialization for faster discovery. Alternatively, in various embodiments, detected set reporting may be limited to event triggered measurement reports.

At 308, UE 12 communicates a detected set measurement report to small cell radio AP 14 including one or more detected set PSC(s) and corresponding measurement(s) associated with the detected set PSC(s). In various embodiments, the measurements can include, but not be limited to, received chip energy to noise (Ec/No) ratio and/or received signal code power (RSCP) for each corresponding detected set PSC(s). At 310 can small cell radio AP 14 check for reported PSC(s) outside the current (e.g., initial) neighbor list (e.g., not included in the current neighbor list, which could be the initial neighbor list at this point in the operations). If new PSC(s) are detected (e.g., any detected set PSC(s) not included in the neighbor list), small cell radio AP 14 can perform a lookup for each new PSC against the peer APs table and the peer neighbors table at 312. Otherwise, if no new PSC(s) are detected, small cell radio AP 14 can continue to 320 and await another measurement report from UE 12.

However, if there is a lookup success for any new detected set PSC(s) against the neighbor information tables, small cell radio AP 14 can add the UE detected neighbors (e.g., corresponding to the returned PSC(s) to the neighbor list) at 314. Otherwise if there is a lookup fail, small cell radio AP 14 can, in certain embodiments, record and/or report the received PSC(s) which were not located in the neighbor information tables (e.g., report to small cell management system 16) as shown at 318. In certain embodiments, small cell radio AP 14 can also rank the neighbors in the neighbor list as shown at 316. In certain embodiments, small cell radio AP 14 can rank UE detected neighbors highest in the neighbor list. Accordingly, embodiments of communication system 10 can provide for collaborative neighbor management, including providing for ranked neighbor management, in a network environment. In various embodiments, communication system 10 can provide for such features while minimizing reliance on UE capabilities (e.g., not needing UEs to be at least 3GPP Release 9 compliant).

Figure 4:
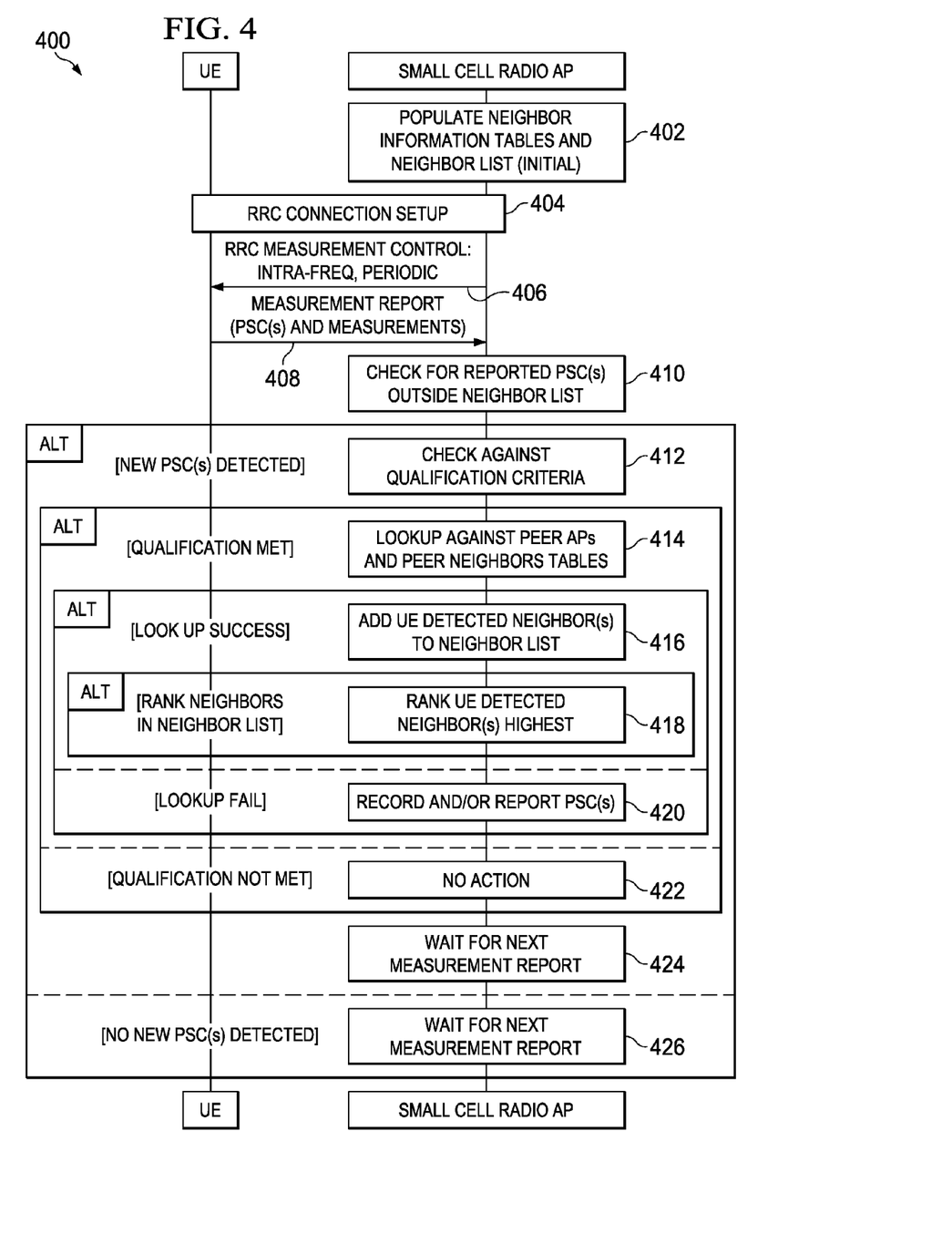
FIG. 4 is simplified sequence diagram illustrating other example operations associated with providing collaborative neighbor management in a network environment in accordance with one potential embodiment of the communication system.

FIG. 4 is simplified sequence diagram illustrating example operations 400 associated with providing collaborative neighbor management in a network environment in accordance with one potential embodiment of the communication system. In various embodiments, operations 300 can be performed by a given UE (e.g., UE 12) and a given small cell AP (e.g., small cell radio AP 14 via neighbor management module 20).

The operations illustrated in FIG. 4 are largely similar to those illustrated in FIG. 3 except that additional operations may be provided in which small cell radio AP 14 may check various measurement information included in the measurement report for the detected set PSCs against one or more qualification criteria prior to performing a lookup on its neighbor information tables. In various embodiments, qualification of UE detected neighbors can be used to eliminate neighbors from being included in the neighbor list of a given cell radio (e.g., small cell radio AP 14), which, although detected by a given UE, may actually be poor SIB 11 reselection candidates and/or handout candidates as the signal strength for the APs as measured by the UE may be poor.

In certain embodiments, the qualification criteria can include comparing received chip energy to noise (Ec/No) ratio received by the UE associated with the corresponding PSC against a configured Ec/No threshold and/or comparing received signal code power (RSCP) associated with the corresponding PSC against a configured RSCP threshold. Thus, as shown in FIG. 4, operations 402-410 may be similar to those as described for 302-310 in FIG. 3.

At 412, small cell radio AP 14 may check certain measurement information for any new corresponding PSC(s) included in the detected set measurement report from UE 12 against one or more qualification criteria (e.g., less than, less than or equal to, equal to, greater than, greater than or equal to one or more qualification threshold(s) for corresponding qualification criteria). If the qualification criteria is met for any corresponding detected set PSC(s), small cell radio AP 14 may continue to process the detected set PSC(s) at 414, 416, 418, 420 and 426 using various operations, which may be similar to the corresponding operations as described at 312, 314, 316, 318 and 320, as discussed in FIG. 3. Otherwise, if the qualification criteria is not met, small cell radio AP 14 may not take any further action for any corresponding PSC(s) not meeting the qualification criteria, as shown at 422. In some cases, no new PSC(s) may meet the qualification criteria, in which cases, small cell radio AP 14 may wait for another measurement report to be received from UE 12 as shown at 424. Accordingly, embodiments of communication system 10 can provide for collaborative neighbor management for qualified neighbors meeting certain qualification criteria as well as providing for ranked neighbor management in a network environment. In various embodiments, communication system 10 can provide for such features while minimizing reliance on UE capabilities (e.g., not needing UEs to be at least 3GPP Release 9 compliant).

Figure 5:
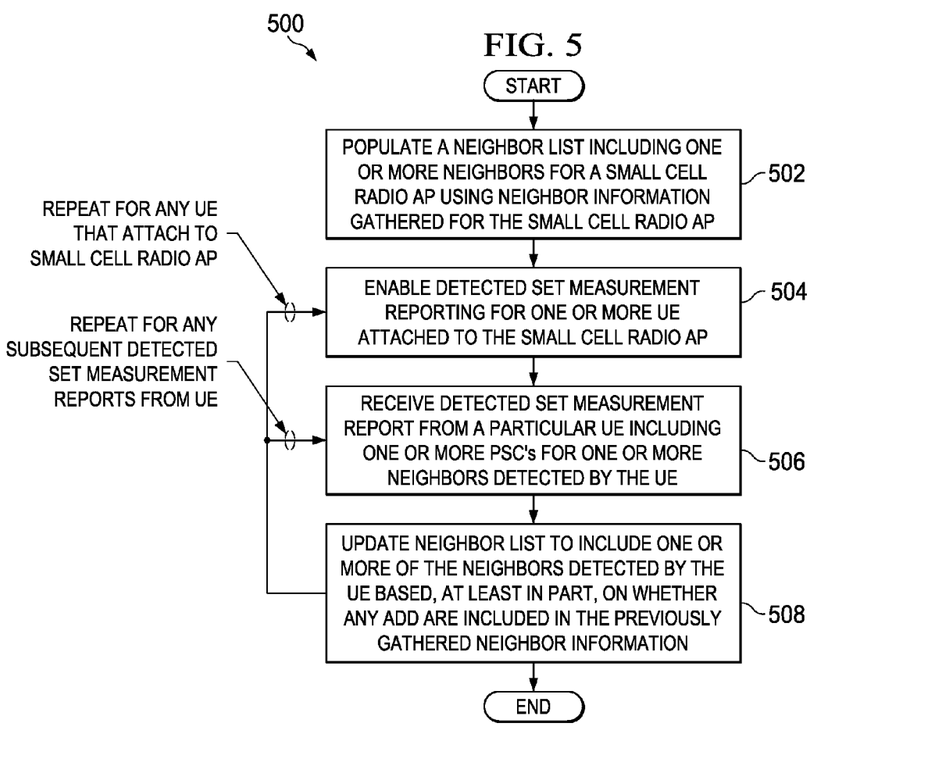
FIG. 5 is a simplified flow diagram illustrating example operations associated with providing collaborative neighbor management in a network environment in accordance with one potential embodiment of the communication system.

Referring to FIG. 5, FIG. 5 is a simplified flow diagram illustrating example operations 500 associated with providing collaborative neighbor management in a network environment in accordance with one potential embodiment of the communication system. In various embodiments, operations 500 can be performed by a given UE (e.g., UE 12) and a given small cell radio AP (e.g., small cell radio AP 14 via neighbor management module 20). At 502, the operations can include populating a neighbor list including one or more neighbors for the small cell radio AP using neighbor information gathered for the cell radio. In various embodiments, the populating can be performed at power-on and/or initialization of the small cell radio AP. At 504, the operations can include enabling detected set measurement reporting for one or more user equipment attached to the small cell radio AP. At 506, the operations can include the small cell radio AP receiving a detected set measurement report from a particular UE (e.g., UE 12) including one or more PSCs for one or more neighbors detected by the UE. At 508, the operations can include updating the neighbor list for the small cell radio AP to include one or more neighbors detected by the UE based, at least in part, on whether any corresponding neighbor PSC(s) are also included in the previously gathered neighbor information for the small cell radio AP.

In various embodiments, the operations can include repeating 506 and 508 for any subsequent detected set measurement reports received from the UE. In various embodiments, the operations can include repeating 504, 506 and 508 for any subsequent UEs that may attach to the small cell radio AP.

Note that in this Specification, references to various features (e.g., elements, structures, modules, components, steps, operations, characteristics, etc.) included in 'one embodiment', 'example embodiment', 'an embodiment', 'another embodiment', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   populating a neighbor list including one or more neighbors for a cell radio using neighbor information gathered for the cell radio, wherein the neighbor information comprises a plurality of neighbor information tables including, at least in part, a peer access points (APs) table including neighbor cell radios discovered by the cell radio in a grid for the cell radio using an Internet Protocol (IP) grid discovery process that comprises exchanging primary scrambling codes (PSC) information and cell identification information for the neighbor cell radios via IP communications;
   receiving a plurality of detected set measurement reports from a user equipment (UE), wherein each detected set measurement report includes, at least in part, one or more PSCs and corresponding signal strength information for each of one or more other neighbor cell radios detected by the UE;
   for each detected set measurement report received from the UE, performing a lookup against the neighbor information tables associated with the previously gathered neighbor information using one or more PSCs received in each detected set measurement report for each of the one or more other neighbor cell radios detected by the UE;
   for each of a corresponding PSC located in a given neighbor information table, comparing signal strength information for the corresponding PSC against a signal strength threshold; and updating the neighbor list to include one or more of the other neighbor cell radios based, at least in part, on whether any of the one or more PSCs received in any detected set measurement report are included in any neighbor information table associated with the previously gathered neighbor information and have a signal strength that is greater than or equal to the signal strength threshold, wherein the updating further comprises:

removing any redundant neighbor cell radios from the neighbor list; and removing any neighbor cell radios from the neighbor list that are persistently not included in the plurality of detected set measurement reports received from the UE.

2. The method of claim 1, wherein the neighbor information tables further comprises:

a peer neighbors table including other neighbor cell radios discovered by the neighbor cell radios that were discovered using the IP grid discovery process and that are outside the grid for the cell radio; and a network listen table including neighbor cell radios detected over-the-air by the cell radio.

3. The method of claim 1, wherein the updating further comprises ranking the neighbor cell radios in the neighbor list.

4. The method of claim 3, wherein the ranking includes providing top priority to the one or more other neighbor cell radios for which PSCs were received from the UE in a particular detected set measurement report.

5. The method of claim 1, wherein the signal strength information is associated with a measurement of at least one of:

received chip energy to noise (Ec/No) ratio received by the UE associated with the corresponding PSC; and received signal code power (RSCP) associated with the corresponding PSC.

6. The method of claim 1, further comprising:

enabling detected set measurement reporting for the UE.

7. One or more non-transitory tangible media encoding logic that includes instructions for execution by a processor, wherein the execution causes the processor to perform operations, comprising:

populating a neighbor list including one or more neighbors for a cell radio using neighbor information gathered for the cell radio, wherein the neighbor information comprises a plurality of neighbor information tables including, at least in part, a peer access points (APs) table including neighbor cell radios discovered by the cell radio in a grid for the cell radio using an Internet Protocol (IP) grid discovery process that comprises exchanging primary scrambling codes (PSC) information and cell identification information for the neighbor cell radios via IP communications;

receiving a plurality of detected set measurement reports from a user equipment (UE), wherein each detected set measurement report includes, at least in part, one or more PSCs and corresponding signal strength information for each of one or more other neighbor cell radios detected by the UE;

for each detected set measurement report received from the UE, performing a lookup against the neighbor information tables associated with the previously gathered neighbor information using one or more PSCs received in each detected set measurement report for each of the one or more other neighbor cell radios detected by the UE;

for each of a corresponding PSC located in a given neighbor information table, comparing signal strength information for the corresponding PSC against a signal strength threshold; and updating the neighbor list to include one or more of the other neighbor cell radios based, at least in part, on whether any of the one or more PSCs received in any detected set measurement report are included in any neighbor information table associated with the previously gathered neighbor information and have a signal strength that is greater than or equal to the signal strength threshold, wherein the updating further comprises:

removing any redundant neighbor cell radios from the neighbor list; and removing any neighbor cell radios from the neighbor list that are persistently not included in the plurality of detected set measurement reports received from the UE.

8. The media of claim 7, wherein the neighbor information tables further comprise:

a peer neighbors table including other neighbor cell radios discovered by the neighbor cell radios that were discovered using the IP grid discovery process and that are outside the grid for the cell radio; and a network listen table including neighbor cell radios detected over-the-air by the cell radio.

9. The media of claim 7, wherein the updating further comprises ranking the neighbor cell radios in the neighbor list.

10. The media of claim 9, wherein the ranking includes providing a top priority to the one or more other neighbor cell radios for which PSCs were received from the UE in a particular detected set measurement report.

11. The media of claim 7, wherein the signal strength information is associated with at least one of:

a received chip energy to noise (Ec/No) ratio received by the UE associated with the corresponding PSC; and a received signal code power (RSCP) associated with the corresponding PSC.

12. An apparatus, comprising:

a memory element for storing data; and a processor for executing instructions associated with the data, wherein the executing causes the apparatus to perform operations, comprising:

populating a neighbor list including one or more neighbors for a cell radio using neighbor information gathered for the cell radio, wherein the neighbor information comprises a plurality of neighbor information tables including, at least in part, a peer access points (APs) table including neighbor cell radios discovered by the cell radio in a grid for the cell radio using an Internet Protocol (IP) grid discovery process that comprises exchanging primary scrambling codes (PSC) information and cell identification information for the neighbor cell radios via IP communications;

receiving a plurality of detected set measurement reports from a user equipment (UE), wherein each detected set measurement report includes, at least in part, one or more PSCs and corresponding signal strength information for each of one or more other neighbor cell radios detected by the UE;

for each detected set measurement report received from the UE, performing a lookup against the neighbor information tables associated with the previously gathered neighbor information using one or more PSCs received in each detected set measurement report for each of the one or more other neighbor cell radios detected by the UE;

for each of a corresponding PSC located in a given neighbor information table, comparing signal strength information for the corresponding PSC against a signal strength threshold; and updating the neighbor list to include one or more of the other neighbor cell radios based, at least in part, on whether any of the one or more PSCs received in any detected set measurement report are included in any neighbor information table associated with the previously gathered neighbor information and have a signal strength that is greater than or equal to the signal strength threshold, wherein the updating further comprises:

removing any redundant neighbor cell radios from the neighbor list; and removing any neighbor cell radios from the neighbor list that are persistently not included in the plurality of detected set measurement reports received from the UE.

13. The apparatus of claim 12, wherein the neighbor information tables comprise:

a peer neighbors table including other neighbor cell radios discovered by the neighbor cell radios that were discovered using the IP grid discovery process and that are outside the grid for the cell radio; and a network listen table including neighbor cell radios detected over-the-air by the cell radio.

14. The apparatus of claim 12, wherein the updating includes further comprises ranking the neighbor cell radios in the neighbor list.

15. The apparatus of claim 14, wherein the ranking includes providing top priority to the one or more other neighbor cell radios for which PSCs were received from the UE in a particular detected set measurement report.

16. The apparatus of claim 12, wherein the signal strength information is associated with a measurement of at least one of:

received chip energy to noise (Ec/No) ratio received by the UE associated with the corresponding PSC; and received signal code power (RSCP) associated with the corresponding PSC.

17. The apparatus of claim 12, wherein the executing causes the apparatus to perform further operations, comprising:

enabling detected set measurement reporting for the UE.

* * * * *